Patented Apr. 22, 1952

2,593,976

UNITED STATES PATENT OFFICE 2,593,976

COMPOSITION COMPRISING ETHYL CELLULOSE AND A FATTY OIL ACID MODIFIED ALKYD RESIN

Harry Burrell, Milburn, and Percy M. Clark, Roselle, N. J., assignors to Interchemical Corporation, New York, N. Y., a corporation of Ohio No Drawing. Application April 22, 1949, Serial No. 89,144

10 Claims. (Cl. 260—16)

This invention relates to new and useful compositions of matter. More particularly the invention relates to protective and decorative lacquer compositions containing ethyl cellulose and a drying oil modified alkyd resin.

Organic solvent soluble ethyl cellulose, i. e. ethyl cellulose of 43.5 to 49.5% ethoxyl content, has been used extensively in the past in preparation of protective and decorative finishing compositions. It has been used either alone or with other film-forming materials in formulating a large variety of protective and decorative finishes. Ethyl cellulose lacquers dry to tough films which have good resistance to both alkali and acid, they have good aging properties and good color stability in sunlight. Notwithstanding the above valuable properties, ethyl cellulose lacquers have not been entirely satisfactory in many applications, especially where good adhesion to metal or other surfaces is required. To overcome the relatively poor adhesion of ethyl cellulose films, attempts have been made to mix the ethyl cellulose with a large variety of other film-forming materials, especially alkyd resins. So far the attempts to produce compatible mixtures of ethyl cellulose with fatty oil acid modified alkyd resins have not been very successful. It has been especially difficult to obtain compatibility of short to medium length fatty oil acid modified alkyds and ethyl cellulose, particularly in mixtures containing high ratios of alkyd to ethyl cellulose.

We have now discovered that certain fatty oil acid modified alkyd resins are compatible with organic solvent soluble ethyl cellulose in all proportions. Based on this discovery we are able to formulate lacquer compositions containing ethyl cellulose and an alkyd resin in any desired ratio.

The fatty oil acid modified alkyd resins used in the invention are those of 30 to 55% fatty oil acid length and acid numbers of about 20 to 80, prepared from fatty oil acid, alkyd resin-forming polyhydric alcohol, and polycarboxylic acid reactants resulting from the condensation of approximately 1 to 2 moles of dicyclopentadiene with 1 mole of ethylenically unsaturated dicarboxylic acid or anhydride such as fumaric acid or maleic anhydride. The preparation of alkyd resins of this type is broadly disclosed and claimed in the copending application of Charles S. Rowland and Albert G. Chenicek, Serial No. 764,576, filed July 29, 1947, now abandoned.

For the purposes of the present invention the modified alkyds are prepared by first condensing, preferably at temperatures of about 180 to 210° C., from 1 to 2.0 moles of dicyclopentadiene with 1 mole of the unsaturated dicarboxylic acid, in the presence or absence of the fatty oil acid. The condensation is preferably continued until condensation is complete as indicated by no further refluxing of the dicyclopentadiene. Polyhydric alcohol is then added, preferably in excess of the amount required to esterify all the carboxyl groups of the unsaturated dicarboxylic acid and the fatty oil acid, and heating at esterification temperatures is continued until the acid number is of the order of 20 to 80. When the fatty acid is not present during the condensation between dicyclopentadiene and unsaturated dicarboxylic acid, it is added preferably at the same time as the polyhydric alcohol or at any time during or after the addition of the polyhydric alcohol. In certain instances the polyhydric alcohol can be used in substantially stoichiometric quantities, for instance, with glycerol, and also in certain cases it can be used in excess to the extent of 40% or more, especially with glycerol. It has been found however that the preferred range is from 10 to about 25% in excess of the amount required to combine with all of the carboxyl groups.

Alkyd resin-forming polyhydric alcohols which are operable in preparing the modified alkyd resins used in the present invention include trihydric alcohols such as glycerol and trimethylol propane, tetrahydric alcohols such as erythritol, and pentaerythritol, and hexahydric alcohols such as mannitol and sorbitol. It will be seen that these alcohols are those which are conventionally used in preparing alkyd resins and our numerous experiments indicate that the invention is operable with alkyd resin-forming polyhydric alcohols in general. The term "alkyd resin-forming polyhydric alcohol" as used herein is meant to include polyhydric compounds which are conventionally used in the manufacture of alkyds, and which, as those persons skilled in the art are cognizant of, do not contain all sorts of reactive substituents which alter the course of the alkyd resin-forming reaction. Such substances as cellulose, starch, and sugars are therefore excluded. The polyhydric alcohols, which are alkyd resin-forming polyhydric alcohols, are in general, polyhydric alcohols containing from three to about ten hydroxyl groups, and containing no other substituent groups that are reactive under the conditions used in preparing alkyd resins. A minor amount of dihydric alcohols can be used along with the higher polyfunctional alcohols if desired.

The fatty acids that are operable in the present invention are those which are derived from drying oils, semi-drying oils and non-drying oils by saponification. Typical of the acids are: soya fatty acids, linseed fatty acids, castor oil fatty acids, dehydrated castor oil fatty acids, tall oil acids, oiticica oil acids, tung oil acids, cottonseed oil acids, and the like.

Ethyl cellulose having from about 43.5 to 49.5% ethoxyl content can be employed in the invention. It is well known that the solubility of ethyl cellulose in volatile organic solvents varies considerably, depending for the most part on the ethoxyl content, and to a lesser extent on the degree of polymerization or viscosity grade. Ethyl cellulose having an ethoxyl content of 46.5 to 48.5% is known to be more generally soluble in volatile organic solvents than other ethyl cellulose grades and for this reason it will generally be preferred in the present invention. Such ethyl celluloses are generally soluble in one or more of the common organic solvents such as ethyl acetate, butyl acetate, toluene, xylene, benzene, acetone, methanol, ethanol, butanol, ethylene dichloride, carbon tetrachloride, aliphatic hydrocarbons, and the like or in mixtures of these solvents. Other ethyl celluloses, for example, ethyl cellulose containing 43.5 to 45% ethoxyl, can be used in the invention but of course more care must be used in selecting the solvent to be used. This however is not a serious handicap since it is well known that the solubility of ethyl cellulose in non-polar solvents such as hydrocarbons generally decreases as the ethoxyl content decreases. Thus when the lower ethylation derivatives of cellulose are used, increasing amounts of polar solvents such as ethyl acetate, methanol, ethylene dichloride, and the like, must be used.

The ratio of ethyl cellulose to alkyd resin in the lacquer is not critical, in fact, this is one of the desirable characteristics of the lacquers prepared in accordance with the invention. Since the alkyd resin and ethyl celluloses are compatible in substantially all proportions, the properties of lacquers made in accordance with the invention can be varied over a broad range to suit the particular application for which the lacquer is to be employed. It is obvious however that if the modifying effect of the alkyd resin is to be appreciable the alkyd must be used in an appreciable amount. It has been our experience that the ratio by weight of ethyl cellulose to alkyd resin should be 10 to 90 parts of ethyl cellulose to 90 to 10 parts of alkyd. Lacquers in which the film-forming materials are present within these limits can be formulated to give very resistant baked films having good adherence to metal surfaces. The adhesion of the films to metal surfaces increases with increasing amounts of alkyd resin in the film.

Another important feature of the invention is the fact that it makes possible the use of ethyl cellulose and alkyd resins in conjunction with other thermosetting and thermoplastic film-forming materials such as thermosetting melamine-formaldehyde, urea-formaldehyde, and phenol-formaldehyde resins, or thermoplastic materials such as acrylic resins, ester gums, and the like. Thermosetting resins, among other things, greatly improve the hardness and mar resistance of the films.

Lacquer compositions prepared in accordance with the invention also can contain other conventional additives used in the formulation of paints, lacquers, varnishes and the like. For instance, catalysts or driers, used to increase the rate of cure of the films, may be employed. Also, plasticizers for the ethyl cellulose and/or alkyd resin can be used.

The following examples in which the parts are by weight are given to further illustrate the invention:

*Example 1—Preparation of the alkyd resins*

To 592 parts of dicyclopentadiene, in a reaction flask equipped with stirrer and reflux condenser, was added 444 parts of maleic anhydride and 600 parts of soy fatty acids. This reaction mixture was stirred and heated, over a period of 30 minutes, to a temperature of 180° C. An exothermic reaction occurred at about 180° C. which caused the temperature to rise rapidly to 210° C. and caused rapid refluxing even though the heat source was removed. When the temperature had again dropped to 190° C., heating was continued for 50 minutes at 190–200° C. at which time refluxing had practically ceased. The reflux condenser was then removed and a current of inert gas (carbon dioxide) was started through the apparatus. Glycerol (400 parts)

TABLE I

| Resin No. | Fatty Acid and Alcohol Reactants | Percent of Fatty Acid | Molar Ratio of Dicyclopentadiene to Maleic Anhydride | Percent Excess of Polyhydric Alcohol | Acid No. |
|---|---|---|---|---|---|
| 1 | Linseed acids Pentaerythritol. | 45 | 1 | 10 | 39 |
| 2 | Same as 1 | 45 | 1.84 | 10 | 38 |
| 3 | Same as 1 | 52 | 1 | 13 | 34 |
| 4 | Linseed oil acids Glycerol. | 54 | 1 | 10 | 12 |
| 5 | 1:1 Mixture of Linseed : tung oil acids Glycerol. | 43 | 1 | 10 | 28 |
| 6 | Same as 5 | 52 | 1 | 10 | 19 |
| 7 | Soya acids Glycerol. | 30 | 1 | 10 | 38 |
| 8 | Same as 7 | 35 | 1 | 10 | 32 |
| 9 | Same as 7 | 40 | 1 | 10 | 31 |
| 10 | Same as 7 | 50 | 1 | 10 | 31 |
| 11 | Dehydrated castor oil acids Glycerol. | 45 | 1 | 10 | 44 |
| 12 | Coconut oil acids Glycerol. | 50 | 1 | 0 | 68 |
| 13 | Castor oil acids Glycerol. | 50 | 1 | 0 | 37 |
| 14 | Same as 4 | 52 | 1 | 10 | 14 |
| 15 | Same as 7 | 30 | 1 | 10 | 32 |
| 16 | Dehydrated castor oil acids Glycerol. | 41 | 1 | 10 | 30 | was then added and heating was continued at 200° to 210° C. until the product had an acid number of 41 (2.5 hours was required). Numerous other resins have been prepared in similar manner except that when pentaerythritol was used as the polyhydric alcohol it was found preferable to add one-half of the required amount of pentaerythritol first, wait until the reaction had subsided, and then add the other half of the pentaerythritol. Table I lists several of the resins that have been prepared and found to be useful in the present invention. All the resins in Table I were made using maleic anhydride as the unsaturated dibasic acid reactant.

In the preparation of lacquers the films dry faster if the ethyl cellulose content is about 25% or more of the total solids, in which case the films usually dry out of dust in less than 10 minutes and dry tack-free in one half to one hour. The films are tough, fairly hard, and have good adhesion and gloss.

Example 2

A typical lacquer formulation according to the invention is as follows:

| | |
|---|---|
| Resin No. 7 of Table I | 15.0 |
| Ethyl cellulose (46.8 to 48.5% ethoxyl, viscosity of approx. 7 cps. in 5% solution of of 80:20 toluol:ethyl alcohol mixture at 25° C.) | 15.0 |
| Toluene | 28.0 |
| Xylene | 24.5 |
| Ethanol | 10.5 |
| Butanol | 7.0 |

When one coat of this lacquer was sprayed on bare wood, it dried dust free in 10 minutes and dried tack-free in 25 minutes. The dried film was clear, and free from orange peel or pebbled surface appearance.

Example 3

| | |
|---|---|
| Resin No. 14 of Table I | 10 |
| Ethyl cellulose (same as Example 2) | 10 |
| Toluene | 51 |
| Xylene | 16 |
| Ethyl alcohol, denatured | 13 |

The ethyl cellulose and resin were dissolved in the solvents to give a clear lacquer. Films of the lacquer on a glass panel dried to a tack-free film in 71 minutes. On overnight drying the film showed good strength. Baking at 300° F. for 15 minutes toughened the films and improved their adhesion.

Example 4

| | |
|---|---|
| Resin No. 15 of Table I | 1.7 |
| Ethyl cellulose (same as Example 2) | 15.0 |
| Toluol | 2.5 |
| Xylol | 69.0 |
| Ethyl alcohol, denatured | 11.8 |

The above ingredients, when mixed, gave a clear lacquer. When the lacquer was coated on a glass panel it dried to a tack-free film in 10 minutes. The dried films were hard and tough, and had markedly better adhesion than straight ethyl cellulose films.

Example 5

| | |
|---|---|
| Resin No. 5 of Table I | 6.0 |
| Ethyl cellulose (same as Example 2) | 18.0 |
| Toluol | 57.6 |
| Xylol | 4.0 |
| Ethyl alcohol, denatured | 14.4 |

Films of the above lacquer dried tack-free in 7 minutes. Adhesion was improved by baking the films at 300° F. for 15 minutes.

Example 6

| | |
|---|---|
| Resin No. 16 of Table I | 5.0 |
| Ethyl cellulose (same as Example 2) | 15.0 |
| Toluol | 51.0 |
| Xylol | 6.0 |
| Ethyl alcohol, denatured | 13.0 |
| n-Butanol | 10.0 |

The above mixture gave a clear solution and produced extremely hard films with good adhesion when poured on glass panels. Tack-free films were obtained after a 30 minute air dry.

Example 7

| | |
|---|---|
| Resin No. 3 of Table I | 6.5 |
| Ethyl cellulose (same as Example 2) | 17.5 |
| Toluol | 55.5 |
| Xylol | 6.5 |
| Ethyl alcohol, denatured | 14.0 |

This lacquer gave clear tough films with good adhesion. The films became tack-free after drying in air for 11 minutes.

Example 8

| | |
|---|---|
| Resin No. 11 of Table I | 10.0 |
| Ethyl cellulose (44.5 to 45.5% ethoxyl content, and viscosity of approx. 50 cps. in 5% solution in 70:30 toluol:ethanol mixture at 25° C.) | 10.0 |
| Toluol | 48.0 |
| Xylol | 6.5 |
| Ethyl alcohol, denatured | 20.5 |
| n-Butanol | 5.0 |

The above ingredients gave a clear lacquer which dried to tough rubbery films on air drying.

Example 9

| | |
|---|---|
| Resin No. 11 of Table I | 10.0 |
| Ethyl cellulose (45.5 to 46.8% ethoxyl content, and viscosity of approx. 22 cps. in 5% solution 70:30 toluol: ethanol mixture at 25° C.) | 10.0 |
| Toluol | 48.0 |
| Xylol | 6.5 |
| Ethyl alcohol, denatured | 20.5 |
| n-Butanol | 5.0 |

The clear solution obtained from the above ingredients gave clear tough films having good adhesion.

Example 10

| | |
|---|---|
| Resin No. 11 from Table I | 3.6 |
| Ethyl cellulose (43.5 to 44.5% ethoxyl content and viscosity of approx. 100 cps. in 5% solution in 70:30 toluol:ethanol mixture at 25° C.) | 3.6 |
| Xylol | 4.0 |
| Toluol | 22.7 |
| Ethyl alcohol, denatured | 10.0 |
| Methyl ethyl ketone | 55.0 |
| Methyl isobutyl ketone | 3.0 |

This lacquer gave a tough, hard film having only a faint trace of a haze.

Example 11

| | |
|---|---|
| Resin No. 11 from Table I | 21.0 |
| Ethyl cellulose (same as Example 2) | 2.5 |
| Butylated urea-formaldehyde, as 60% solution in an equal admixture of n-butanol and xylol, e. g. Uformite F-200-E (solids basis) | 13.7 |
| n-Butanol (including that added with the urea-formaldehyde resin) | 8.3 |
| Xylol (including that added with the urea-formaldehyde resin) | 41.4 |
| Ethyl alcohol, denatured | 2.1 |
| Toluol | 8.3 |
| n-Butyl acid phosphate (catalyst) | 0.8 |

The above mixture gave a slightly hazy solution typical of urea resin mixtures. Films of the lacquer can be baked at 150° F. for 1 hour to give hard, bright, mar resistant films having excellent adhesion properties.

Example 12

A blue enamel was prepared by grinding

| | |
|---|---|
| Titanium dioxide | 2.40 |
| Iron blue | 1.15 |
| Iron oxide | .90 |
| Carbon black | .35 |
| Xylol | 8.60 |
| Resin No. 5 from Table I | 3.60 | in a steel ball mill for 72 hours and then adding this pigment dispersion to a vehicle consisting of:

| | |
|---|---|
| Ethyl cellulose (same as Example 9) | 8.30 |
| Resin No. 5 from Table I | 12.90 |
| Plasticizer (ethylene glycol ester of sebacic acid and ricinoleic acid, e. g. Paraplex RG-2 | 1.70 |
| Xylol | 12.10 |
| Toluol | 24.00 |
| Ethyl alcohol, denatured | 14.00 |
| n-Butanol | 10.00 |

The enamel was thinned to spraying viscosity with a thinner consisting of 30% xylol, 35% toluol, 20% ethyl alcohol and 15% n-butanol. Sprayed coatings of the enamel air dried to glossy, moderately tough films, free from haze or signs of incompatibility. Harder and tougher enamels can be obtained by increasing the ratio of ethyl cellulose to resin to 50:50.

Example 13

A white enamel was prepared by mixing

| | |
|---|---|
| Titanium dioxide | 12.5 |
| Ethyl cellulose (46.8 to 48.5% ethoxyl and viscosity of approx. 22 cps. in 5% solution in 80:20 toluol:ethanol mixture) | 1.8 |
| Ethyl alcohol, denatured | 2.1 |
| Toluol | 8.6 | in a heavy dough mixer until the pigment was suitably dispersed. The pasty pigment dispersion was then added to a vehicle consisting of:

| | |
|---|---|
| Ethyl cellulose (same as Example 2) | 11.4 |
| Resin No. 3 from Table I | 4.4 |
| Xylol | 20.0 |
| Toluol | 18.2 |
| Ethyl alcohol, denatured | 9.1 |
| n-Butanol | 11.9 |

Films of the enamel air dried quickly to hard, tough films having excellent gloss. Baking at 150° F. for 1 hour, or at 300° F. for 15 minutes, increased the hardness of the films. The films had good adhesion to Bonderized steel as well as to prime coated steel.

Conventional driers, such as lead, cobalt and manganese driers, can be added to the above composition to increase the rate of cure of the films.

We claim:

1. A resin composition comprising 10 to 90 parts ethyl cellulose having an ethoxyl content of 43.5 to 49.5% admixed with 90 to 10 parts of a 30 to 55% fatty oil acid modified alkyd resin, said alkyd resin consisting of the heat esterification product of fatty oil acid, alkyd resin-forming polyhydric alcohol and polycarboxylic acid resulting from the condensation of 1 to 2 moles of dicyclopentadiene with 1 mole of alpha, beta-ethylenically unsaturated dicarboxylic acid.

2. A resin composition comprising 10 to 90 parts ethyl cellulose having an ethoxyl content of 43.5 to 49.5% admixed with a plasticizer and 90 to 10 parts of a 30 to 55% fatty oil acid modified alkyd resin, said alkyd resin consisting of the heat esterification product of fatty oil acid, alkyd resin-forming polyhydric alcohol and polycarboxylic acid resulting from the condensation of 1 to 2 moles of dicyclopentadiene with 1 mole of alpha, beta-ethylenically unsaturated dicarboxylic acid.

3. A composition as claimed in claim 1 wherein the fatty oil acid is a drying oil fatty acid.

4. A composition of matter comprising a solution of 10 to 90 parts ethyl cellulose having an ethoxyl content of 43.5 to 49.5% and 90 to 10 parts of a 30 to 55% fatty oil acid modified alkyd resin, said alkyd resin consisting of the heat esterification product of fatty oil acid, alkyd resin-forming polyhydric alcohol and polycarboxylic acid resulting from the condensation of 1 to 2 moles of dicyclopentadiene with 1 mole of alpha, beta-ethylenically unsaturated dicarboxylic acid.

5. A composition of matter comprising a solution of 10 to 90 parts ethyl cellulose having an ethoxyl content of 43.5 to 49.5%, a plasticizer, and 90 to 10 parts of a 30 to 55% fatty oil acid modified alkyd resin, said alkyd resin consisting of the heat esterification product of fatty oil acid, alkyd resin-forming polyhydric alcohol, and polycarboxylic acid resulting from the condensation of 1 to 2 moles of dicyclopentadiene with 1 mole of alpha, beta-ethylenically unsaturated dicarboxylic acid.

6. A composition of matter comprising a solution of 10 to 90 parts ethyl cellulose having an ethoxyl content of 43.5 to 49.5%, a thermosetting resin of the group consisting of thermosetting urea-formaldehyde resin, melamine-formaldehyde resin and phenol-formaldehyde resin, and 90 to 10 parts of a 30 to 55% fatty oil acid modified alkyd resin, said alkyd resin consisting of the heat esterification product of fatty oil acid, alkyd resin-forming polyhydric alcohol, and polycarboxylic acid resulting from the condensation of 1 to 2 moles of dicyclopentadiene with 1 mole alpha, beta-ethylenically unsaturated dicarboxylic acid.

7. A composition as claimed in claim 4 wherein the fatty oil acid is a drying oil fatty acid.

8. A composition as claimed in claim 4 wherein the polyhydric alcohol is glycerol.

9. A composition as claimed in claim 4 wherein the polyhydric alcohol is pentaerythritol.

10. A composition as claimed in claim 4 wherein the polycarboxylic acid reactant is maleic anhydride.

HARRY BURRELL.
PERCY M. CLARK.

REFERENCES CITED

The following references are of record in the file of this patent:

UNITED STATES PATENTS

| Number | Name | Date |
|---|---|---|
| 2,243,185 | Bacon et al. | May 27, 1941 |
| 2,290,563 | Kauppi | July 21, 1942 |
| 2,423,234 | Gerhart et al. | July 1, 1947 |